United States Patent [19]
Aihara et al.

[11] Patent Number: 4,933,380
[45] Date of Patent: Jun. 12, 1990

[54] AIR-DRYING AQUEOUS COATING COMPOSITION FOR ELECTRODEPOSITION

[75] Inventors: Tetsuo Aihara, Isehara; Yasuharu Nakayama, Fujisawa; Shigeki Matsubara, Hiratsuka, all of Japan

[73] Assignee: Kansai Paint Co., Hyogo, Japan

[21] Appl. No.: 403,050

[22] Filed: Sep. 1, 1989

Related U.S. Application Data

[63] Continuation of Ser. No. 73,190, Jul. 14, 1987, abandoned.

[30] Foreign Application Priority Data

Jul. 14, 1986 [JP] Japan ................................ 61-165018

[51] Int. Cl.$^5$ ................... C08L 63/00; C08L 51/08
[52] U.S. Cl. ..................... 523/403; 523/409; 523/454; 523/455; 523/456; 524/901; 525/65; 525/111.5
[58] Field of Search ............................... 523/403, 409; 525/111.5, 65; 524/901

[56] References Cited

U.S. PATENT DOCUMENTS

| | | | |
|---|---|---|---|
| 3,030,321 | 4/1962 | Lombardi | 260/23 |
| 3,098,834 | 7/1963 | Jerebek | 206/23.7 |
| 3,230,162 | 1/1966 | Gilchrist | 523/403 |
| 3,293,201 | 12/1966 | Shahade | 260/23 |
| 3,364,162 | 1/1968 | Huggard | 523/409 |
| 3,369,983 | 2/1968 | Hart | 204/181 |
| 3,385,076 | 9/1968 | Jeffery | 523/407 |
| 3,679,615 | 7/1972 | Gilchrist | 523/409 |

Primary Examiner—C. Warren Ivy
Attorney, Agent, or Firm—Wenderoth, Lind & Ponack

[57] ABSTRACT

An air-drying aqueous coating composition for eletrodeposition comprising
  [A] water-solubilized product or a water-dispersed product obtained by reacting (A-1) an epoxy resin and (A-2) a maleinized product of a (semi)drying oil fatty acid-modified vinyl polymer having an acid value of 10 to 200 in such proportions that the solids weight ratio of the component (A-1) to the component (A-2) is from 90/10 to 5/95, and
  [B] an amphoteric organic solvent having affinity for component [A].

15 Claims, No Drawings

AIR-DRYING AQUEOUS COATING COMPOSITION FOR ELECTRODEPOSITION

This application is a continuation of application Ser. No 073, 190 filed on July 14, 1987, now abandoned.

This invention relates to an electrodeposition coating aqueous composition which can be dried and cured at room temperature. More specifically, this invention relates to an air-drying coating composition for electrodeposition coating comprising a water-solubilized or water-dispersed product of the reaction product formed between an epoxy resin and a maleinized product of a fatty acid-modified polymer as a main component.

The electrodeposition coating method is widely used in coating automobiles and other metallic products because of its many advantages. For example, as compared with other coating methods such as flow coating, brush coating, spray coating and dip coating, the electrodeposition coating method permits coating of articles having complex shapes in a uniform film thickness, and the loss of the coating composition is little so that the efficiency of its utilization is very high. Furthermore, tearing, sagging, stagnation, etc. do not easily occur in the coated surface. However, since heat-curing type aqueous paints used in almost all conventional electrodeposition coating processes require high temperatures of more than 100° C. for curing, such the electrodeposition coating processes are difficult to apply to articles having a high heat capacity, or may suffer from economic losses.

The present inventors thought that if an aqueous paint which can be dried and cured at room temperature can be applied by electrodeposition coating without the need to bake the coated film at a high temperature and a practical film can be formed at room temperature, the aforesaid defects of the electrodeposition coating method would be able to be eliminated while retaining its advantages mentioned above. On the basis of this thought, the present inventors have made investigations on airdrying aqueous coating compositions suitable for electrodeposition coating.

Curability at room temperature alone is not sufficient as a characteristic which the aqueous coating composition for use in electrodeposition, should have. It must have some rigorous requirements at the same time. For example, (1) its paint components should not be deteriorated, but have excellent stability, in an electrodeposition coating bath. (2) It should give a coated film having excellent smoothness at room temperature. (3) It should have good throwing power.

The present inventors tried to perform electrodeposition coating with emulsion-type and aqueous solution-type air drying aqueous coating compositions comprising alkyd resins or maleinized polybutadiene. It was found that the tested emulsion-type aqueous coating compositions did not give dense coated films having excellent smoothness and their throwing powers were not sufficient. The water-soluble alkyd resin coating compositions did not have a sufficient film hardness, and took a long period of time for film drying. In addition, the alkyd resin easily hydrolyzed in the electrodeposition coating bath, and the stability of the bath was poor. Hence, the coating compositions had poor throwing power and roughening occurred in the coated film surface. On the other hand, the water-soluble maleinized polybutadiene coating composition hardly hydrolyzed, but was not practical since it had poor drying property at room temperature.

Thus, air-drying aqueous coating compositions generally used heretofore lack one or more of bath stability, throwing power, film drying property and film smoothness which are among the properties required of the air drying aqueous coating composition for electrodeposition coating.

As an improvement over the aforesaid disadvantages, the present inventors previously proposed an air-drying aqueous resin composition for electrodeposition comprising as a main component a water-solubilized maleinized product of a fatty acid-modified polymer having a glass transition temperature of −30° to 60° C., a fatty acid residue content of 5 to 70% by weight and an acid value of 5 to 260 and prepared by addition of maleic acid and/or maleic anhydride to drying oil fatty acid residues and/or semi-drying oil fatty acid residues bonded through an ester linkage to main chains of a polymer of a polymerizable unsaturated monomer (Japanese Laid-Open Patent Publication No. 207973/1984). This resin composition, however, give a coated film having defective properties (particularly in regard to initial film hardness and antiblocking property) when the drying time after electrodeposition coating is short. Its storage stability, water resistance and alkali resistance are still insufficient. If the above copolymer is rendered water-dispersed by decreasing its acid value, it has excellent water resistance and alkali resistance. But since the hydrophilicity and hydrophobicity of the dispersed particles cannot be properly balanced, the composition has poor storage stability and bath stability.

The present inventors have made extensive investigations in order to develop an air-drying aqueous coating composition for electrodeposition coating. These investigations have now led to the discovery that an electrodeposition coating composition having good storage stability and good bath stability and being capable of forming a coated film having excellent hardness, antiblocking property, water resistance and alkali resistance at room temperature can be obtained by using an aqueous composition of a product obtained by reacting an epoxy resin and a maleinized product of a vinyl polymer modified with a (semi)drying oil fatty acid.

Thus, according to this invention, there is provided an air-drying aqueous coating composition for electrodeposition comprising

[A] a water-solubilized product or a water-dispersed product obtained by reacting (A-1) an epoxy resin and (A-2) a maleinized product of a (semi)drying oil fatty acid-modified vinyl polymer having an acid value of 10 to 200 in such proportions that the solids weight ratio of the component (A-1) to the component (A-2) is from 90/10 to 5/95, and

[B] an amphoteric organic solvent having affinity for component [A].

The term "maleinized product of a (semi)drying oil fatty acid-modified vinyl polymer" denotes a maleinized product of a semidrying oil fatty acid-modified vinyl polymer, a maleinized product of a drying oil fatty acid-modified vinyl polymer, and a mixture of these.

Since the component A is an epoxy resin which is hard and hydrophobic and has excellent adhesion to a metal substrate, an electrodeposited film from the composition of this invention has excellent initial film hardness, adhesion, water resistance, alkali resistance and antiblocking property. Furthermore, since the epoxy resin is chemically bonded to the maleinized product of the vinyl polymer as component (A-2), the component [A] is stable. In addition, since the epoxy resin component is not vulnerable to hydrolysis by water or a neutralizing agent, the resulting composition has excellent water dispersibility and storage stability, and is stable in an electrodeposition bath.

The epoxy resin (A-1) used in component [A] may be any of those known in the field of paints, and for example, has a number average molecular weight of at least about 350, preferably about 350 to about 10,000, more preferably 450 to 5,500, and an epoxy equivalent of about 140 to about 10,000, preferably about 180 to about 8,000, more preferably 230 to 5,000. Specifically, bisphenol A-epichlorohydrin type epoxy resins are preferred. Examples of commercially available ones include Epikote 828, Epikote 1001, Epikote 1002, Epikote 1003, Epikote 1055, Epikote 1004, Epikote 1007, Epikote 1009 and Epikote 1010 of Shell Chemical Co., and Araldite 6071, Araldite 6084, Araldite 6097, Araldite 6099 and Araldite 7004 of Ciba-Geigy Co. Epoxy resin obtained by modifying the foregoing resins with fatty acids and other monobasic acids such as benzoic acid, methylbenzoic acid and p-tert-butylbenozic acid may also be used. From the standpoint of film hardness, epoxy resins being solid at room temperature are preferred.

The above bisphenol A-epichlorohydrin type epoxy resins may be used in combination with other epoxy resins examples of which are given below.

(1) Phenol/novolak resin-epihalohydrin type epoxy resins; (2) polyhydric alcohol-glycidyl ether type epoxy resins obtained by etherification between glycidyl compounds and polyhydric alcohols such as ethylene glycol, diethylene glycol, triethylene glycol, 1,2-propylene glycol, 1,4-propylene glycol, 1,5-pentanediol, 1,2,6-hexanetriol, glycerol and bis(4-hydroxycyclohexyl)-2,2-propane; and (3) polycarboxylic acid glycidyl ester type epoxy resins derived from polycarboxylic acids such as succinic acid, glutaric acid, terephthalic acid, 2,6-naphthalenedicarboxylic acid and dimerized linolenic acid.

Examples of particularly preferably used epoxy resins in this invention are those of the bisphenol A-epichlorohydrin type represented by the following general formula:

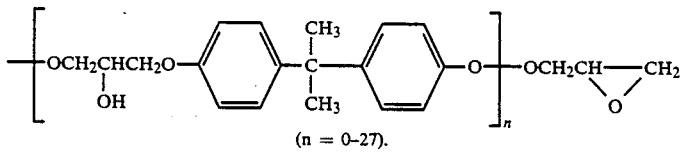

(n = 0–27).

There can also be used bisphenol F-epichlorohydrin type epoxy resins of the formula:

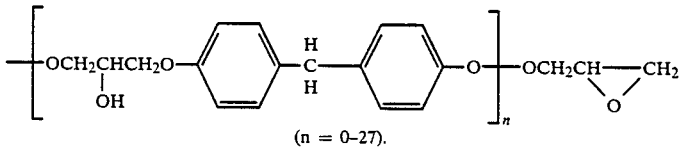

(n = 0–27).

The maleinized product of a (semi)drying oil fatty acid-modified vinyl polymer (A-2) used in component [A] in this invention includes maleinized products of fatty acid-modified polymers (to be sometimes referred to as the "modified maleinized polymers") which can be obtained by addition reaction of maleic acid and/or maleic anhydride with drying oil fatty acid residues and/or semidrying oil fatty acid residues introduced through ester linkages into the main chain of a vinyl polymer obtained by the polymerization of at least one ethylenically unsaturated monomer. Preferred are those which have a glass transition temperature of generally −30° to 60° C., preferably −20° to 50° C. and an acid value of generally 10 to 200, preferably 20 to 180 and contain generally 5 to 70% by weight, preferably 10 to 60% by weight, of the fatty acid residues.

The component (A-2) can be produced by various methods. For example, it can be produced by (a) a method which comprises subjecting a polymer of an ethylenically unsaturated monomer having a hydroxyl or glycidyl group (to be sometimes referred to as the "hydroxyl- or glycidyl-containing monomer") or a copolymer of the hydroxyl- or glycidyl-containing monomer and another ethylenically unsaturated monomer (to be sometimes referred to as "the other vinyl monomer") to esterification reaction with a drying oil fatty acid and/or a semidrying oil fatty acid (to be sometimes referred to as the "unsaturated fatty acid"), and then adding maleic acid and/or maleic anhydride to the unsaturated fatty acid residues in the resulting esterification reaction product; or (b) a method which comprises addition-reaction of maleic acid or its anhydride with the unsaturated fatty acid residues in a polymer of the esterification reaction product between the hydroxyl- or glycidyl-containing monomer and the unsaturated fatty acid, or a copolymer of the esterification reaction product with the other vinyl monomer.

In the method (a) above, the polymer of the hydroxyl- or glycidyl-containing monomer and the copolymer of it with the other vinyl monomer can be produced by methods known per se. The copolymer preferably contains at least 5% by weight, preferably 10 to 90% by weight, based on its weight, of units from the hydroxyl- or glycidyl-containing monomer. In the esterification reaction between the hydroxyl groups and/or glycidyl groups in the polymer or copolymer and the unsaturated fatty acid, the amount of the unsaturated fatty acid is preferably adjusted so that the content of the unsaturated fatty acid residues is within the range of 5 to 70% by weight in the modified maleinized polymer. Usually, the esterification reaction is carried out by heating the two components to 50° to 300° C. Maleic acid or maleic anhydride adds to the unsaturated fatty acid residues in the esterification reaction product (maleinization). This maleinization can be carried out by an ordinary method. For example, it can be carried out by reacting maleic acid or its anhydride at a temperature of 120° to 250° C. When many hydroxyl groups remain in the main chain of the polymer, maleinization is preferably carried out after the excessive hydroxyl groups are blocked by esterification with low or high molecular monobasic acids such as acetic acid, propionic acid or stearic acid. When maleinization is carried out by using maleic anhydride, it is desirable to ring-open the acid anhydride group which adds to the fatty acid residues. This can be accomplished by reacting water, alcohols, ammonia, amines, etc. The amount of maleic acid or maleic anhydride is adjusted so that the final acid value of the maleinized product is within the range of 10 to 200.

In the method (b), the esterification reaction between the hydroxyl- or glycidyl-containing monomer and the unsaturated fatty acid can be carried out by methods known per se. For example, the reaction of the hydroxyl-containing ethylenically unsaturated monomer with the unsaturated fatty acid is carried out at a temperature of about 110° to 160° C. for about 0.5 to 9 hours in a suitable inert organic solvent, preferably a water-immiscible organic solvent having a boiling point of not more than 180° C., such as aromatic hydrocarbons (e.g., benzene, toluene or xylene) and aliphatic hydrocarbons (e.g., heptane, hexane or octane) in the presence of an esterification catalyst such as sulfuric acid, aluminum sulfate, methylsulfuric acid, p-toluenesulfonic acid, hydrochloric acid and phosphoric acid and a polymerization inhibitor such as hydroquinone, methoxyphenol, tert-butylcatechol and benzoquinone. The reaction of the glycidyl-containing ethylenically unsaturated monomer with the unsaturated fatty acid can be carried out in the above organic solvent in the presence of the above polymerization inhibitor at a temperature of generally 60° to 220° C., preferably 120° to 170° C., for about 0.5 to 40 hours, preferably 3 to 10 hours. The polymerization of the esterification reaction product or the copolymerization of the esterification reaction product with the other vinyl monomer may be carried out by methods known per se for the production of acrylic copolymers, for example, by a solution polymerization method, an emulsion polymerization method or a suspension polymerization method. Advantageously, it is preferred to carry out this reaction by the solution polymerization method. The monomers are reacted in a suitable organic solvent (for example, at least one solvent selected from the organic solvents to be described hereinbelow) in the presence of a radical polymerization catalyst (for example, azo compounds, peroxide compounds, sulfides, sulfines, diazo compounds, nitroso compounds, or redox systems) at a temperature of usually about 0° to 180° C., preferably about 40° to 170° C., for about 1 to 20 hours, preferably about 2 to 10 hours. In the copolymerization of the esterification reaction product with the other vinyl monomer, the amount of the esterification reaction product is preferably adjusted such that the content of the unsaturated fatty acid residues in the modified maleinized polymer is 5 to 70% by weight. For example, the amount of the esterification product is at least 5% by weight in the monomeric mixture. Addition of maleic acid or maleic anhydride to the unsaturated fatty acid residues in the polymer or copolymer so obtained (maleinization) may be carried out in the same way as in the method (a).

Examples of the hydroxyl- or glycidyl-containing monomer used in the methods (a) and (b) include allyl alcohol; hydroxy-($C_2$–$C_5$)alkyl (meth)acrylates such as 2-hydroxyethyl methacrylate, 2-hydroxyethyl acrylate, hydroxypropyl methacrylate and hydroxypropyl acrylate; and glycidyl methacrylate and glycidyl acrylate.

Examples of the other vinyl monomer that can be copolymerized with the above monomer include vinyl aromatic compounds such as styrene, vinyltoluene and alpha-methylstyrene; nitriles such as acrylonitrile and methacrylonitrile; esters between aliphatic monohydric alcohols having 1 to 26 carbon atoms and acrylic or methacrylic acid, such as methyl acrylate, propyl acrylate, butyl acrylate, 2-ethylhexyl acrylate, lauryl acrylate, methyl methacrylate, propyl methacrylate, butyl methacrylate, hexyl methacrylate, and lauryl methacrylate; esters between ethylene glycol monoalkyl ethers or diethylene glycol monoalkyl ethers (containing 1 to 8 carbon atoms in the alkyl moiety) and acrylic or methacrylic acid; esters betweeen propylene glycol monoalkyl ethers or dipropylene glycol monoalkyl ethers (containing 1 to 8 carbon atoms in the alkyl moiety); and addition-reaction products between monocarboxylic acids having 4 to 26 (such as formic acid, valeric acid and iso-nonanoic acid) other than the above unsaturated fatty acids and glycidyl methacrylate or glycidyl acrylate. Preferred among the above monomers are those which have excellent copolymerizability with the hydroxyl- or glycidyl-containing monomer or the esterification reaction product of it with the unsaturated fatty acid, and can give modified maleinized polymers stable at high temperatures. Monomers used generally in radical polymerization, such as butadiene, isoprene, chloroprene, pentadiene, vinyl acetate vinyl chloride, and Veova monomer (tradename for a product of Shell Chemical Co., U.S.A.) may also be used as the other monomer.

The unsaturated fatty acid serves to impart air drying property. Drying or semidrying oil fatty acids containing many non-conjugated double bonds and 6 to 30, preferably 17 to 20, carbon atoms are preferred because they easily permit maleinization without involving gellation and give electrodeposited films having excellent air drying property. Examples include safflower oil fatty acid, soybean oil fatty acid, linseed oil fatty acid, sesame oil fatty acid, perilla oil fatty acid, grape kernel fatty acid, corn oil fatty acid, hemp seed fatty acid, poppy seed fatty acid, sunflower oil fatty acid, tall oil fatty acid, cotton seed oil fatty acid, rubber seed oil fatty acid and walnut oil fatty acid. Safflower oil fatty acid, linseed oil fatty acid, soybean oil fatty acid and tall oil fatty acid are preferred. Mustard oil fatty acid, oiticica oil fatty acid, peanut oil fatty acid, tung oil fatty acid, dehydrated castor oil fatty acid and HY-diene (tradename for a product of Soken Chemical Co., Japan) can also be used.

The reaction of the epoxy resin (A-1) with the maleinized product of the (semi)drying oil fatty acid-modified vinyl polymer (A-2) can be carried out by mixing the two and heating the mixture usually at about 50° to 180° C. while the acid value of the reaction product is monitered.

The mixing ratio between the epoxy resin (A-1) and the maleinized product (A-2) of the (semi)drying oil fatty acid-modified vinyl polymer, as the weight ratio of the solids, is 90/10 to 5/95, preferably 80/20 to 7/93, more preferably 70/30 to 7/93.

The reaction product (component [A]) may have an acid value of generally about 7 to about 130, preferably about 15 to about 100, more preferably 15 to 90 in view of storage stability and film properties. From the viewpoint of film properties, it may have a number average molecular weight of generally about 500 to about 1,500,000, preferably about 1,000 to about 200,000, more preferably 2,000 to 150,000.

The component [A] (water-solubilized product or water-dispersed product) can be obtained by neutralizing part or the hole of the carboxyl groups in the reaction product with an aqueous solution of a neutralizing agent. The neutralizing agent may, for example, be ammonia, an amine, an alkali metal hydroxide, an alkali metal carbonate or an alkali metal bicarbonate. Examples of the amine are primary, secondary or tertiary lower alkylamines, primary, secondary or tertiary lower alkanolamines, and cycloalkylamines. The term "lower", as used herein means that a group or a compound so qualified has not more than 6, preferably not more than 4, carbon atoms. Illustrative of the alkali metal hydroxide are potassium hydroxide and sodium hydroxide. The alkali metal carbonate or bicarbonate may, for example, be sodium carbonate and sodium bicarbonate. Triethylamine is particularly preferred as the neutralization agent. Triethylamine is also effective as a reaction catalyst for the components (A-1) and (A-2). The amount of the neutralization agent may generally be within the range of 0.1 to 2.0 equivalents, preferably 0.5 to 1.2 equivalents, based on the carboxyl groups in the reaction product.

The coating composition of this invention can be obtained by mixing the component [A] with the organic solvent [B] and water to dissolve or disperse it.

To increase the smoothness (gloss) of the surface of a coated film, the coating composition of this invention contains the amphoteric organic solvent having affinity for the component [A] and water as component [B]. The amphoteric organic solvent is distributed to the electrodeposited film and serves to impart flowability to it. The component B] dissolves the component A) and is miscible with water. If desired, a non-hydrophilic solvent which dissolves the component A) but is not miscible with water may be used together with the amphoteric organic solvent to improve the flowability of the coated film further. Examples of the amphoteric organic solvent are Cellosolve solvents of the formula HO—CH$_2$CH$_2$—OR$_1$ wherein R$_1$ represents an alkyl group having 1 to 8 carbon atoms, such as butyl Cellosolve and ethyl Cellosolve; carbitol solvents of the formula HO—CH$_2$CH$_2$—O—CH$_2$CH$_2$—OR$_1$ wherein R$_1$ is as defined, such as methyl carbitol and butyl carbitol; glyme solvents of the formula R$_2$O—CH$_2$CH$_2$—OR$_3$ wherein each of R$_2$ and R$_3$ represents an alkyl group having 1 to 3 carbon atoms, such as ethylene glycol dimethyl ether; diglyme solvents of the formula R$_2$O—CH$_2$CH$_2$OCH$_2$CH$_2$—OR$_3$ wherein R$_2$ and R$_3$ are as defined, such as diethylene glycol dimethyl ether; Cellosolve acetate solvents of the formula R$_4$O—CH$_2$OCOCH$_3$ wherein R$_4$ represents a hydrogen atom or a methyl or ethyl group, such as ethylene glycol monoacetate and methyl Cellosolve acetate; and alcohols of the formula R$_5$OH wherein R$_5$ represents an alkyl group having 1 to 4 carbon atoms, such as ethanol, propanol, n-butanol, sec-butanol and isobutanol. Diacetone alcohol, dioxane, tetrahydrofuran, acetone, dimethylformamide and 3-methoxy-3-methylbutanol may also be used. Among the above organic solvents, n-butyl Cellosolve, ethyl Cellosolve, butyl carbitol, isopropanol and sec-butanol are especially preferred.

Examples of the non-hydrophilic solvent include aromatic hydrocarbons of the formula

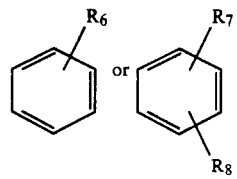

wherein R$_6$ represents a hydrogen atom or an alkyl group having 1 to 4 carbon atoms, and R$_7$ and R$_8$ each represent an alkyl group having 1 to 4 carbon atoms, such as toluene and xylene; acids or esters of the formula R$_9$—COO—R$_{10}$ wherein R$_9$ represents an alkyl group having 1 to 6 carbon atoms and R$_{10}$ represents a hydrogen atom, an alkyl group having 1 to 6 carbon atoms, or a cyclohexyl group, such as ethyl formate, butyl formate, cyclohexyl acetate; ketones of the formula R$_{11}$R$_{12}$C=O wherein each of R$_{11}$ and R$_{12}$ represents an alkyl group having 1 to 8 carbon atoms and

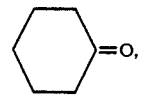

such as methyl ethyl ketone and cyclohexanone; ethers of the formula R$_{11}$—O—R$_{12}$ wherein R$_{11}$ and R$_{12}$ are as defined, such as ethyl ether and hexyl ether; and alcohols of the formula R$_{13}$OH wherein R$_{13}$ represents an alkyl group having 5 to 11 carbon atoms, such as hexanol. Among the above non-hydrophilic solvents, butyl acetate, cyclohexanone, hexanol, n-octanol and benzyl alcohol are especially preferred. The amount of the non-hydrophilic solvent used is generally not more than 70% by weight, preferably 5 to 60% by weight, more preferably 10 to 55% by weight, based on the total amount of the two solvents.

The suitable amount of the organic solvent [B] to be added is generally 15 to 500 parts by weight, preferably 30 to 200 parts by weight, especially preferably 50 to 150 parts by weight, per 100 parts by weight (as solids of the component [A]).

As required, a coloring pigment, an extender pigment, a corrosion inhibiting pigment, and a surfactant may be incorporated in the aqueous coating composition of this invention as is usual in the art.

A metal salt dryer in general use, such as cobalt naphthenate or lead naphthenate, may be added to increase the air drying property of the coated film at room temperature. But since it is likely to reduce the stability of the electrodeposition bath, its amount is preferably selected to meet the required bath stability. Specifically, the amount of the metal salt drying agent is generally 0.001 to 0.1 part, preferably 0.002 to 0.08 part, as the weight of the metal per 100 parts by weight (as solids of the component [A]).

The aqueous coating composition of this invention produced as above can be widely used as an electrodeposition paint. In electrodeposition coating, the electrodeposition coating bath may be obtained by diluting the coating composition with water so that the content of the resin solids (mainly the component [A]) in the composition becomes generally 3 to 25% by weight, preferably 5 to 20% by weight.

An article to be coated may be an article of any size and shape if at least the surface of it is formed of an electrically conductive metal. Since the aqueous coating composition does not require heating to cure the coated film, it can be applied advantageously to articles which have a large heat capacity and are difficult to permit curing of the coated film by heating. Specific examples are articles made of iron, aluminum, and steel, either as such or as surface-treated chemically by known methods (for example, with zinc phosphate or iron phosphate).

The electrodeposition coating may be carried out by known methods. For example, the temperature of the electrodeposition coating bath prepared as above is adjusted to 10° to 50° C., preferably 20° to 35° C., and the article to be coated is immersed in it as an anode. A voltage of 10 to 300 V, preferably 30 to 250 V, is applied across the article and a separately provided cathode for 30 seconds to 20 minutes, preferably 1 to 10 minutes to deposit a coated film on the surface of the article (anode). Then, the article is withdrawn from the electrodeposition coating bath and left to stand at room temperature, whereby the coated film dries and cures. If required, the coated article may be heated to such an extent that the film components do not thermally decompose (less than about 250° C.)

The following Examples and Comparative Examples illustrate the present invention more specifically. In the following examples, all parts and percentages are by weight.

Preparation of epoxy resin [A-1]

Epikote 1007 (epoxy equivalent 1750–2200; number average molecular weight 2900) and Epikote 1004 (epoxy equivalent 875–975; number average molecular weight 1400) were each dissolved in n-butyl Cellosolve to form 70% solutions designated as [A-1① ] and [A-②].

Preparation of (semi)drying oil fatty acidmodified vinyl polymer [A-2]

[A-2-①]

A mixture consisting of 1264 parts of RJ-100 (a tradename for a styrene/alklyl alcohol copolymer having a number average molecular weight of 1600 and a hydroxyl content of 7.8% by weight, a product of Monsanto Chemical Co.), 1180 parts of linseed oil fatty acid, 100 parts of xylene and 1.5 parts of dibutyltin oxide was put in a reactor, and reacted at 230° C. for 10 hours while water of condensation formed was removed from the reaction system. There was obtained a resin having an acid value of 5.5. Maleic anhydride (145 parts) was added to the resin and maleinization was carried out for 7 hours at 190° to 200° C.

Xylene and unreacted maleic anhydride were removed by vacuum distillation, and then water was added to ring-open the anhydride group. n-Butyl Cellosolve was added to give a modified maleinized polymer having an acid value of 56 and a solids content of 76.5% (glass transition temperature −10°; fatty acid residue content 46% by weight).

[A-2- ② ]

A mixture consisting of 1264 parts of RJ-100 (a tradename for a styrene/alkyl alcohol copolymer having a number average molecular weight of 1600 and a hydroxyl content of 7.8% by weight, a product of Monsanto Chemical Co.), 1180 parts of soybean oil fatty acid, 100 parts of xylene and 1.5 parts of dibutyltin oxide was put in a reactor, and reacted at 230° C. for 10 hours while water of condensation formed was removed from the reaction system. There was obtained a resin having an acid value ov 5.5. Maleic anhydride (116 parts) was added to the resin and maleinization was carried out for 7 hours at 190° to 200° C.

Xylene and unreacted maleic anhydride were removed by vacuum distillation, and then water was added to ring-open the anhydride group. n-Butyl Cellosolve was added to give a modified maleinized polymer having an acid value of 45 and a solids content of 79.5% (glass transition temperature −13°; fatty acid residue content 47% by weight).

[A-2- ③ ]

A mixture consisting of 1264 parts of RJ-100 (a tradename for a styrene/alklyl alcohol copolymer having a number average molecular weight of 1600 and a hydroxyl content of 7.8% by weight, a product of Monsanto Chemical Co.), 1180 parts of linseed oil fatty acid, 100 parts of xylene and 1.5 parts of dibutyltin oxide was put in a reactor, and reacted at 230° C. for 10 hours while water of condensation formed was removed from the reaction system. There was obtained a resin having an acid value ob 5.5. Maleic anhydride (165 parts) was added to the resin and maleinization was carried out for 7 hours at 190° to 200° C.

Xylene and unreacted maleic anhydride were removed by vacuum distillation, and then water was added to ring-open the anhydride group. n-Butyl Cellosovle was added to give a modified maleinized polymer having an acid value of 80 and a solids content of 80% (glass transition temperature −15°; fatty acid residue content 46% by weight).

EXAMPLE 1

A reaction vessel was charged with 288 parts of Epikote 1007 solution ([A-1-①], 262 parts of the modified maleinized polymer [A-2-①] and triethylamine (0.1 equivalent based on the carboxyl group), and they were reacted at 130° C. for 4 hours until a resin having an acid value of 22.3 was obtained. Then, the product was cooled to about 50° C., and water and triethylamine were added to obtain an aqueous solution of component A) having a non-volatile content of 26.0%.

Thirty parts of Titanium Dioxide JR-600 (a tradename for rutile-type titanium dioxide made by Teikoku Kako Co., Ltd.) was added to the neutralized solution (per 100 parts of the solids of component [A]). The mixture was dispersed by a paint conditioner, 40 parts of n-butyl Cellosolve was added per 100 parts by weight of the solids of the component [A]. An organic solvent as indicated in Table 1 was added and the mixture was diluted with deionized water so that the total content of the resin and the pigment became 10%. As a result, an aqueous coating composition for electrodeposition coating was prepared.

Electrodeposition coating

The aqueous coating composition was put in a four-liter hard polyvinyl chloride vessel capable of being stirred by a magnetic stirrer, and degreased and polished steel sheet (SPCC JIS-G3141), 75×50×0.8 mm, were used as an anode and a cathode. A dc voltage was applied across the two electrodes by a rectifier (TYPE G-25M GPO250-5, made by Takasago Seisakusho) for 2 minutes. The distance between the electrodes was adjusted to 15 cm. The two electrodes were immersed to a depth of 10 cm in the bath. After applying a voltage of 150 V for 2 minutes, the mild steel sheet as the anode was taken out of the bath and suspended vertically to allow it to dry at room temperature. The stability of the coating composition in the electrodeposition coating bath and the properties of the resulting coated film were measured, and the results are summarized in Table 1.

EXAMPLES 2-5 AND COMPARATIVE EXAMPLES 1-2

In each run, an aqueous coating composition was prepared in accordance with the recipe shown in Table 1 by the same procedure as in Example 1 and the same pigment as in Example 1 was dispersed in it. Using the resulting coating composition, electrodeposition coating was carried out under the same conditions as in Example 1.

The results are shown in Table 1.

of dissolution or dispersion was periodically observed. When there was no change in appearance, the coating composition was applied by electrodeposition coating. The coating film was examined for changes in the state of the coated film, the film thickness, throwing power and the reduction of breakdown voltage.

We claim:

1. An air-drying aqueous coating composition for electrodeposition comprising
   (A) a water-solubilized product or a water-dispersed product obtained by reacting at a temperature of about 50° to 180° C:
   (A-1) a bisphenol A-epichlorohydrin epoxy resin having a number average molecular weight of at least about 350 and an epoxy equivalent of about

TABLE 1

|  | Example 1 | Example 2 | Example 3 | Example 4 | Example 5 | Comparative Example 1 | Comparative Example 2 |
|---|---|---|---|---|---|---|---|
| Composition of resin in [A] | | | | | | | |
| A-1 | | | | | | | |
| A-1- 1 | 288 | 144 | 107 | | 288 | | 288 |
| A-1- 2 | | | | 288 | | | |
| A-2 | | | | | | | |
| A-2- 1 | 262 | 262 | 393 | | | 262 | 262 |
| A-2- 2 | | | | 252 | | | |
| A-2- 3 | | | | | 250 | | |
| Triethylamine | 2 | 2 | 3 | 3 | 3 | 20 | 20 |
| Reaction time (130° C.) (hours) | 4.0 | 4.5 | 3 | 2.5 | 3.5 | | |
| Acid value of the resin in [A] | | | | | | | |
| Before reaction | 28.0 | 37.3 | 44.8 | 40.0 | 22.5 | | 28.0 |
| After reaction | 22.3 | 31.2 | 36.2 | 32.3 | 20.0 | | 28.0 |
| Number average molecular weight | 15000 | 20000 | 20000 | 30000 | 10000 | 7000 | — |
| Water + triethylamine | 4343 + 14 | 3253 + 15 | 4061 + 21 | 4337 + 20 | 4346 + 11 | 2160 | 4338 |
| [B] n-butyl Cellosolve | 11 | 14 | 25 | 20 | 22 | 18 | 12 |
| Organic solvent [B] | | | | | | | |
| n-Octanol | 160 | | | 160 | 80 | 80 | |
| Benzyl alcohol | | 120 | | | 80 | | |
| iso-Propanol | | | 153 | | | | 160 |

TABLE 2

|  | Example | | | | | Comparative Example | |
|---|---|---|---|---|---|---|---|
|  | 1 | 2 | 3 | 4 | 5 | 1 | 2 |
| Properties of the coated film | | | | | | | |
| State of the coated film | Good | Good | Good | Good | Good | Good | Good |
| Thickness (on drying) (μ) | 23 | 24 | 24 | 22 | 25 | 26 | 15 |
| Drying property (20° C.) | | | | | | | |
| Finger touch (minutes) | 30 | 25 | 35 | 25 | 20 | 50 | 100 |
| Curing time (hours) | 2 | 2 | 2 | 2 | 1.5 | 4.5 | 20 |
| Gel fraction (20° C.) (*1) | | | | | | | |
| After drying for 2 hours | 5 | 10 | 12 | 10 | 13 | 3 | 2 |
| After drying for 24 hours | 10 | 15 | 20 | 21 | 25 | 5 | 2 |
| After drying for 72 hours | 25 | 32 | 45 | 40 | 50 | 17 | 3 |
| After drying for 7 days | 45 | 70 | 60 | 67 | 71 | 21 | 8 |
| Hardness (20° C.) | | | | | | | |
| After drying for 3 hours | 2B | 3B | 3B | 2B | 2B | 5B | — |
| After drying for 12 hours | HB | B | B | F | HB | 4B | — |
| After drying for 24 hours | H | HB | HB | H | HB | 2B | 6B |
| Antiblocking property (*2) | Good | Good | Good | Good | Good | Poor | Poor |
| Stability by stirring in the open state (*3) | No change for 8 weeks | No change for 8 weeks | No change for 8 weeks | No change for 8 weeks | No change for 8 weeks | After 8 weeks, there was flocculated matter | After 1 day, there were flocculated matter and separated matter |

Note to Table 2
(*1): Gel fraction
The coated film was immersed in methyl ethyl ketone solution and refluxed for 2 hours. The uncured product was extracted from the coated film, and the gel fraction was determined from the difference in the weight of the coated film before and after the refluxing.
(*2): Antiblocking property
Two test pieces were baked at 80° C. for 10 minutes, and then laid one on top of the other. A gauze was placed on the upper test piece and a weight of 500 was placed on it. The test pieces were then left to stand for 48 hours in a constant-temperature chamber at 50° C.

Two liters of the prepared electrodeposition coating composition was put in a 3-liter wide-mouthed bottle and was kept stirred in the open state at 30? C. The state 140 to about 10,000, and (A-2) a maleinized product having an acid value of 10 to 200, a fatty acid content of 5 to 70% by weight, and a glass transition temperature of −30° to 60° C. and selected from (i) a product produced by subjecting a polymer of an ethylencially unsaturated monomer having a hydroxyl or glycidyl group or a copolymer of the hydroxyl or glycidyl-containing monomer and another ethylenically unsaturated monomer to an esterification reaction with a drying oil fatty acid and/or a semi-drying oil fatty acid, and then reacting maleic acid or its anhydride with the unsaturated fatty acid residues in the resulting esterification reaction product; and (ii) a product obtained by reacting maleic acid or its anhydride when the unsaturated fatty acid residues in a polymer of the esterification reaction product between the said hydroxyl or glycidyl-containing monomer and the said drying and/or semi-drying oil fatty acid, or a copolymer of the esterification reaction product with the said other ethylenically unsaturated monomer, said reactions (A-2) (i) and (ii) each be carried out at a temperature of 120° to 250° C., and wherein the reaction between (A-1) and (A-2) is carried out in such proportions that the solids weight ratio of the component (A-1) to the component (A-2) is from 90/10 to 5/95, and neutrallizing the reaction product of the components (A-1) and (A-2) having an acid value of about 7 to about 130 with a neutralizing agent, and (B) an amphoteric organic solvent having affinity for component (A).

2. The composition of claim 1 wherein the epoxy resin (A-1) has a number average molecular weight of about 350 to about 10,000 and an epoxy equivalent of about 180 to about 8,000.

3. The composition of claim 1 wherein the epoxy resin (A-1) is represented by the following formula

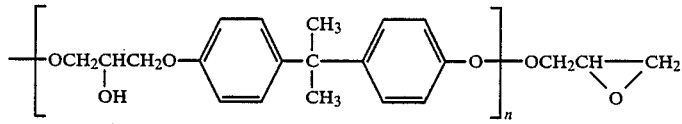

wherein n is 0 to 27.

4. The composition of claim 1 wherein the (semi)drying oil fatty acid is selected from safflower oil fatty acid, linseed oil fatty acid, soybean oil fatty acid and tall oil fatty acid.

5. The composition of claim 1 wherein the weight ratio of the solids content of the epoxy resin (A-1) to the solids content of the maleinized product (A-2) is from 80/20 to 7/93.

6. The composition of claim 1 wherein the resin in [A] has an acid value of about 7 to about 130.

7. The composition of claim 1 wherein the resin in [A] has a number average molecular weight of about 500 to about 1,500,000.

8. The composition of claim 1 wherein the amphoteric organic solvent (B) is selected from ethylene glycol monoalkyl ether solvents, diethylene glycol monoalkyl ether solvents, ethylene glycol dialkyl ether solvents, diethylene glycol dialkyl ether diglyme solvents, acetates of ethylene glycol monoalkyl ether solvents and alcohol solvents.

9. The composition of claim 8 wherein the amphoteric organic solvent is selected from ethylene glycol mono-n-butyl ether, ethylene glycol monoethyl ether, diethylene glycol mono-n-butyl ether, isopropanol and sec-butanol.

10. The composition of claim 1 wherein the amphoteric organic solvent [B] contains a non-hydrophilic solvent.

11. The composition of claim 10 wherein the nonhydrophilic solvent is selected from aromatic hydrocarbons, acids, esters, ketones, ethers and alcohols.

12. The composition of claim 11 wherein the nonhydrophilic solvent is selected from butyl acetate, cyclohexane, hexanol, n-octanol and benzyl alcohol.

13. The composition of claim 10 wherein the content of the non-hydrophilic solvent is not more than 70% by weight.

14. The composition of claim 1 which comprises 100 parts (as solids) of the water-solubilized product or water-dispersed product [A] and 15 to 500 parts by weight of the amphoteric organic solvent [B], 15. An article coated with the composition of claim 1.